Jan. 6, 1948.    D. O. SPROULE    2,434,057
MEANS FOR INDICATING THE ANGULAR DISPLACEMENTS OF A SHAFT AT A DISTANCE
Filed Feb. 26, 1946
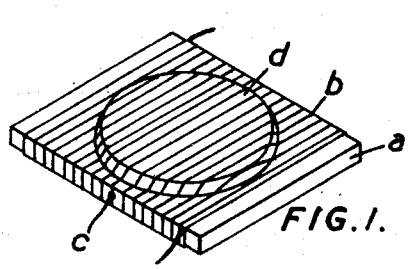
FIG. 1.
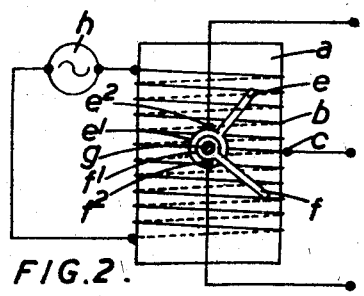
FIG. 2.
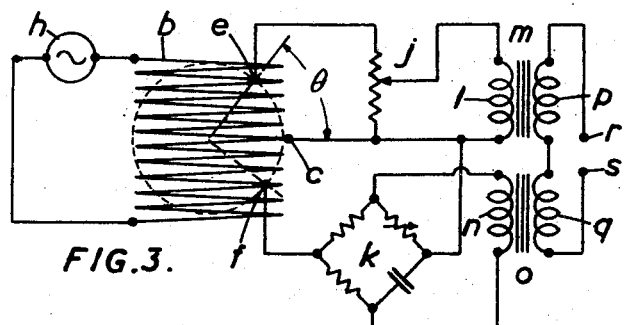
FIG. 3.    FIG. 5.
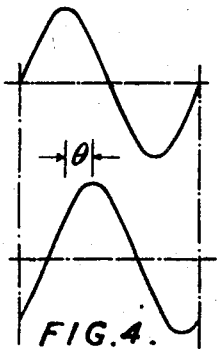
FIG. 4.
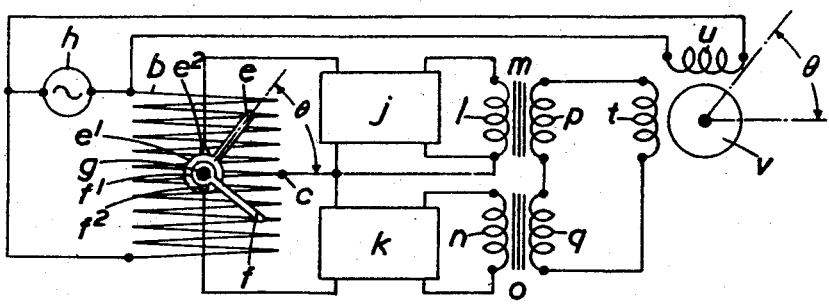
FIG. 6.
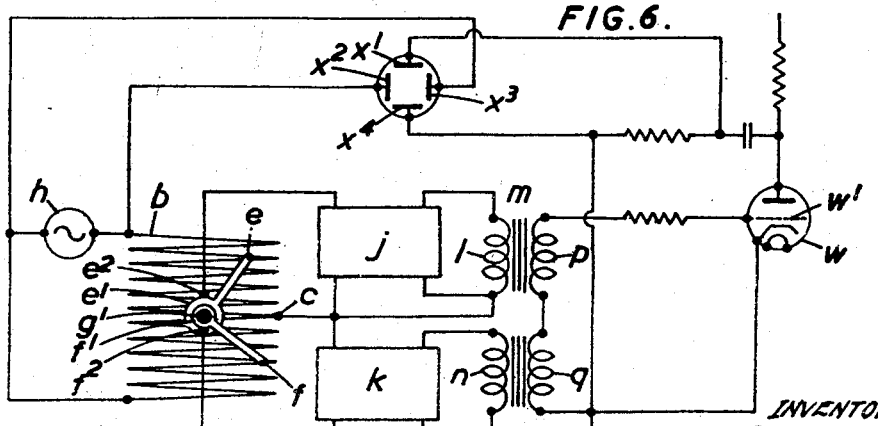
INVENTOR:
Donald Orr Sproule
BY Angus Henry Campbell
ATTORNEYS Patented Jan. 6, 1948

2,434,057

UNITED STATES PATENT OFFICE 2,434,057

MEANS FOR INDICATING THE ANGULAR DISPLACEMENTS OF A SHAFT AT A DISTANCE

Donald Orr Sproule, London, England, assignor of one-half to Henry Hughes & Son Limited, Essex, England, a British limited liability company Application February 26, 1946, Serial No. 650,362
In Great Britain March 30, 1944

7 Claims. (Cl. 177—351)

This invention relates to improved means for indicating the angular displacement of a shaft at a distance and has for its object to provide compact equipment that is of comparatively light weight, that is capable of operating with the necessary precision and that can be produced by refined methods of mass manufacture without serious difficulty.

This invention has reference to electro-mechanical equipment in which the angular displacement of a shaft, i. e. its rotation, produces a phase shift in a sinusoidal voltage E that can be represented by:

$$E = E_0 \sin(\omega t - \theta)$$

so that when the voltage E is fed to an instrumentality responsive to phase shift the angle $\theta$, through which the shaft has been rotated, can be ascertained.

The invention contemplates simple and reliable means that can be used to introduce a precise shift of any value in the phase of a sine wave potential or sinusoidal voltage.

The invention also contemplates simple and reliable electrical means by which the angular displacement, that may be continuous or intermittent or spasmodic, of a shaft at a distance can be ascertained and measured by indicating and/or recording electrical instrumentalities.

The invention further contemplates simple and reliable means which when applied to a direction responsive device e. g. a directional gyro, will indicate the departure of any vehicle, on which such device is mounted, from a set course.

This invention consists in improved phase shifting means and comprises a source of alternating electrical current feeding a sine wave input to the ends of the centre-tapped winding of a sine potentiometer having two brushes electrically insulated from one another and arranged at right angles to one another, means for shifting the phase of the output potential from the centre tap and one brush to be in quadrature with the phase of the output potential from the centre tap and the other brush, means for equalising the potentials in quadrature and means for combining the two potentials in quadrature to produce a sine wave output the phase of the potential of which is shifted through an angle relatively to the phase of the potential of the sine wave input that is equal to the angle between one of the brushes and the radius of the centre tap.

In order that the nature of the invention may be the better understood it will now be described in reation to the figures of the accompanying drawing in which like letters and numerals refer to like or equivalent parts in the different figures.

Figure 1 shows the winding of a sine potentiometer in perspective;

Figure 2 is a plan view of a sine potentiometer with both sine and cosine brushes;

Figure 3 is an electrical diagram of a phase shift network;

Figure 4 is a diagram showing the phase shift produced by the network of Figure 3;

Figure 5 is an electrical diagram of means for indicating the angular displacement of a shaft at a distance;

Figure 6 is an electrical diagram of a cathode ray course indicator.

This invention makes use of a contrivance known as a sine potentiometer which in the form shown in Figures 1 and 2 comprises a flat rectangular sheet $a$ of electrical insulating material, having a winding $b$ of resistance wire provided with a centre tap $c$.

As shown the sheet $a$ is provided with a raised circular boss $d$ so as to form a circular track for two brushes $e$ and $f$ that are insulated from one another and mounted on a shaft $g$ journalled axially of said circular track.

The brushes $e$ and $f$ are fixed at right angles to one another and it can be shown that when an alternating electrical potential is fed from the alternator $h$ to the ends of the winding $b$ the variation in potential of the output between the centre tap $c$ and the brush $e$ follows a sine law and the potential of the output between the centre tap $c$ and the brush $f$ follows a cosine law as the brush $e$ is rotated away from the centre tap $c$.

In other words, when the alternating potential from the alternator $h$ is fed to such an arrangement the said potential will be modulated as the brushes $e$ and $f$ are rotated that is to say, if the voltage E between one end of the winding $b$ and the centre tap $c$ is:

$$E = E_0 \cos \omega t$$

then the voltage $E_1$ between the brush $e$ and the centre tap $c$ will be:

$$E_1 = E_{10} \cos \omega t \sin \theta$$

and the voltage $E_2$ between the brush $f$ and the centre tap $c$ will be:

$$E_2 = E_{20} \cos \omega t \cos \theta$$

where $\theta$ is the angle through which the brush $e$ has been rotated relatively to the centre tap $c$.

In the phase shift network shown in Figure 3 a sine wave input is fed from the alternator $h$ to the ends of the winding $b$ so that the voltage $E$ between one end of the winding $b$ and the centre tap $c$ is:

$$E = E_0 \cos \omega t$$

the output potential $$E_1 = E_{10} \cos \omega t \sin \theta$$

from the centre tap $c$ and the brush $e$ being fed to the attenuation circuit $j$ whilst the output potential:

$$E_2 = E_{20} \cos \omega t \cos \theta$$

from the centre tap $c$ and the brush $f$ is fed to the phase shift circuit $k$.

The phase shift circuit $k$ is arranged to introduce a 90° advance in the phase of the output potential from the centre tap $c$ and the brush $f$ so that the output potential:

$$E_3 = E_{30} \sin \omega t \cos \theta$$

is in quadrature with the output potential $E_1$ from the attenuation circuit $j$ said attenuation circuit $j$ being provided to compensate for any attenuation introduced by the circuit $k$ so that $E_{10}$ is made equal to $E_{20}$ and equal to $E_{30}$.

It will be clear that instead of a 90° phase advance the phase may be equally well retarded by 90°.

To add the potentials $E_1$ and $E_3$ the output from the circuit $j$ is fed to the primary $l$ of the transformer $m$ and the output from the circuit $k$ is fed to the primary $n$ of the transformer $o$ thus giving a resultant voltage:

$$E = E_0 (\sin \omega t \cos \theta - \cos \omega t \sin \theta)$$

which can be simplified to:

$$E = E_0 \sin(\omega t - \theta)$$

The secondaries $p$ and $q$ of the transformers $m$ and $o$ are connected in series so that the phase of the output potential from the terminals $r$ and $s$ will be displaced relatively to the phase of the input potential from the alternator $h$ by an angle $\theta$ equal to the angle between the brush $e$ and the radius of the centre tap $c$ as shown in Figure 4 in which the upper curve represents the voltage:

$$E = E_0 \sin \omega t$$

and the lower curve represents the voltage:

$$E = E_0 \sin(\omega t - \theta)$$

In the means for indicating the angular displacement of a shaft at a distance as shown in Figure 5 the brushes $e$ and $f$ are mounted on the shaft $g$ and to provide for continued rotation of the brushes $e$ and $f$ the brush $e$ is provided with a slip ring $e^1$ and brush $e^2$ whilst the brush $f$ is provided with a slip ring $f^1$ and brush $f^2$.

In this arrangement the output potential from the transformers $m$ and $o$ is compared with the input potential to the winding $b$ by a phase meter instrumentality.

To this end the potential at the variable phase from the transfromers $m$ and $o$ is fed to the coil $t$ whilst the potential at the steady phase from the alternator $h$ is fed to the coil $u$ arranged at right angles to the coil $t$ in the ordinary way, the rotation of the field due to the change in phase relationship being indicated by the rotation of the induction rotor $v$ that is to say, the induction rotor $v$ will be angularly displaced similarly to the angular displacement of the brush $e$ from the centre tap $c$ which is the same as the angular displacement of the shaft $g$.

In the cathode ray course indicator shown in Figure 6 the output shaft $g^1$ of a directional gyro has the brushes $e$ and $f$ mounted thereon so that any divergence from the set course will be represented by a departure of the brush $e$ from the centre tap $c$.

In this arrangement the potential at the steady phase of the alternator $h$ is fed to the horizontal deflecting plates $x^2$ and $x^3$ of the cathode ray oscillograph $x$ and the potential at the variable phase from the transformers $m$ and $o$ is fed to the grid $w^1$ of the triode $w$ for conversion into impulses (i. e. the alternating potential fed to the grid $w^1$ is large compared with the normal grid voltage of the triode $w$) that are fed to the vertical deflecting plates $x^1$ and $x^4$ so that the oscillogram is in the form of a moving "pip" the departure of which from a defined position is a measure of the departure of the vehicle, on which the gyro is mounted from a set course, that is to say, is a measure of the departure of the brush $e$ from the centre tap $c$.

What is claimed is:

1. Apparatus for adjusting the phase of an alternating current in accordance with the angular displacement of a shaft comprising a source of alternating electrical current feeding a sine wave input to the ends of the centre tapped winding of a sine potentiometer having two brushes electrically insulated from one another and arranged at right angles to one another, means for shifting the phase of the output potential from the centre tap and one brush to be in quadrature with the phase of the output potential from the centre tap and the other brush, means for equalising the potentials in quadrature and means for combining the two potentials in quadrature to produce a sine wave output the phase of the potential of which is shifted through an angle relatively to the phase of the potential of the sine wave input that is equal to the angle between one of the brushes and the radius of the centre tap.

2. Means for indicating the angular displacements of a shaft at a distance comprising a centre tapped potentiometer winding, a source of alternating electrical current feeding a sine wave input to the ends of said winding, a first electrically insulated brush mounted on said shaft and disposed to contact with the individual turns of said winding, a second electrically insulated brush mounted on said shaft at right angles to said first electrically insulated brush and disposed to contact with the individual turns of said winding, a phase shifter in circuit with said first brush, a first transformer the primary of which is fed with the output potential from said phase shifter and said centre tap, an attenuator in circuit with said second brush, a second transformer the primary of which is fed with the output potential from said attenuator and said centre tap, means for connecting the secondaries of said first and said second transformers in series and means for comparing the variable phase of the output from said secondaries with the steady phase of the said sine wave input.

3. Means for indicating the angular displacements of a shaft at a distance comprising a centre tapped potentiometer winding, a source of alternating electrical current feeding a sine wave input to the ends of said winding, a first electrically insulated brush mounted on said shaft and disposed to contact with the individual turns of said winding, a second electrically insulated brush mounted on said shaft at right angles to said first electrically insulated brush and disposed to contact with the individual turns of said winding, a phase shifter in circuit with said first brush, a first transformer the primary of which is fed with the output potential from said phase shifter and said centre tap, an attenuator in circuit with said second brush, a second transformer the primary of which is fed with the output potential from said attenuator and said centre tap, means for connecting the secondaries of said first and said second transformers in series, and a phasemeter instrumentality fed with the sine wave input as the reference phase and the output from said secondaries as the variable phase.

4. Means for indicating the angular displacements of a shaft at a distance comprising a centre tapped potentiometer winding, a source of alternating electrical current feeding a sine wave input to the ends of said winding, a first electrically insulated brush mounted on said shaft and disposed to contact with the individual turns of said winding, a second electrically insulated brush mounted on said shaft at right angles to said first electrically insulated brush and disposed to contact with the individual turns of said winding, a phase shifter in circuit with said first brush, a first transformer the primary of which is fed with the output potential from said phase shifter and said centre tap, an attenuator in circuit with said second brush, a second transformer the primary of which is fed with the output potential from said attenuator and said centre tap, means for connecting the secondaries of said first and said second transformers in series and a phasemeter instrumentality fed with the sine wave input as the reference phase and the output from said secondaries as the variable phase to produce a rotating field and having a phase displacement indicating induction rotor.

5. Means for indicating the angular displacements of a shaft at a distance comprising a centre tapped potentiometer winding, a source of alternating electrical current feeding a sine wave input to the ends of said winding, a first electrically insulated brush mounted on said shaft and disposed to contact with the individual turns of said winding, a second electrically insulated brush mounted on said shaft at right angles to said first electrically insulated brush and disposed to contact with the individual turns of said winding, a phase shifter in circuit with said first brush, a first transformer the primary of which is fed with the output potential from said phase shifter and said centre tap, an attenuator in circuit with said second brush, a second transformer the primary of which is fed with the output potential from said attenuator and said centre tap, means for connecting the secondaries of said first and said second transformers in series, thermionic means for converting the output from said secondaries into electrical impulses, a cathode ray oscillograph assembly including vertical deflecting plates and horizontal deflecting plates, means for feeding said impulses to said vertical deflecting plates and means for feeding said sine wave input to said horizontal deflecting plates.

6. Apparatus for adjusting the phase of an alternating current in accordance with the angular displacement of a shaft comprising a source of alternating current, a shaft adapted to be rotated, first means energized by said alternating current source and adjusted automatically by rotation of said shaft for providing a first alternating current output proportional to a trigonometric function of the angle of rotation of said shaft, second means energized by said alternating current source and adjusted automatically by rotation of said shaft for providing a second alternating current output proportional to a different trigonometric function of the angle of rotation of said shaft, means for shifting the phase of said second alternating current output and means for combining said first alternating current output and said second alternating current output of shifted phase, to produce a resultant alternating current the phase of which with respect to the alternating current supplied by said source varies in accordance with the angular displacement of said shaft.

7. Means for indicating the angular displacements of a shaft at a distance, comprising a source of alternating current, first means energized by said alternating current source for providing a first alternating current output proportional to a trigonometric function of the angle of rotation of said shaft, second means energized by said alternating current source for providing a second alternating current output proportional to a different trigonometric function of the angle of rotation of said shaft, means for shifting the phase of said second alternating current output, means for combining said first alternating current output and said second alternating current output of shifted phase, and means for comparing alternating current from said source with said combined alternating current outputs.

DONALD ORR SPROULE.

REFERENCES CITED

The following references are of record in the file of this patent:

UNITED STATES PATENTS

| Number | Name | Date |
|---|---|---|
| 603,778 | Stone et al. | May 10, 1898 |
| 2,241,615 | Plebanski | May 13, 1941 |
| 2,283,103 | Stuart | May 12, 1942 |

FOREIGN PATENTS

| Number | Country | Date |
|---|---|---|
| 518,632 | Great Britain | Mar. 4, 1940 |